Nov. 18, 1941.        K. SIEG        2,262,971
CUTOFF MECHANISM
Filed Feb. 14, 1941        4 Sheets-Sheet 1
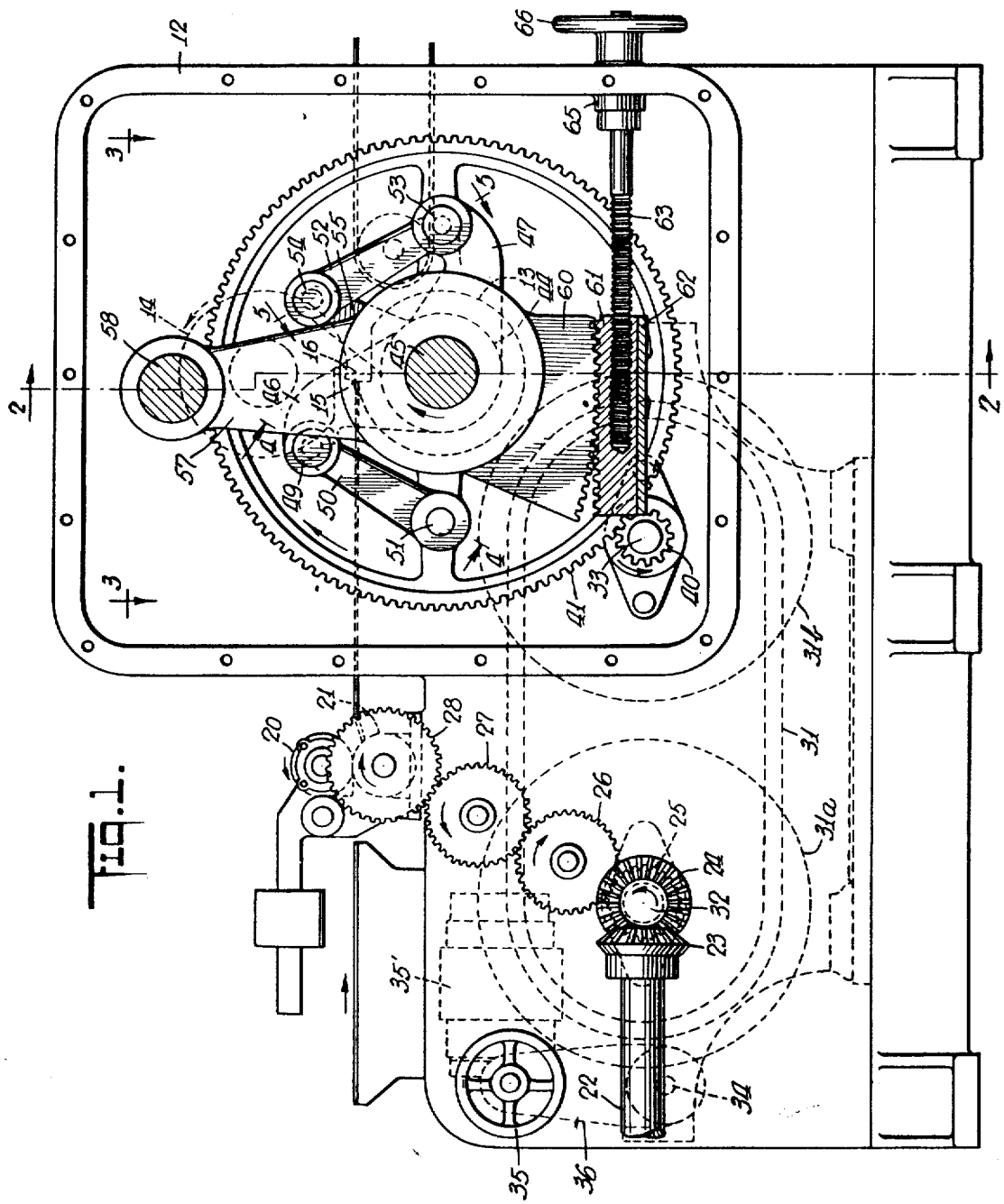
INVENTOR
Karl Sieg
BY
ATTORNEYS

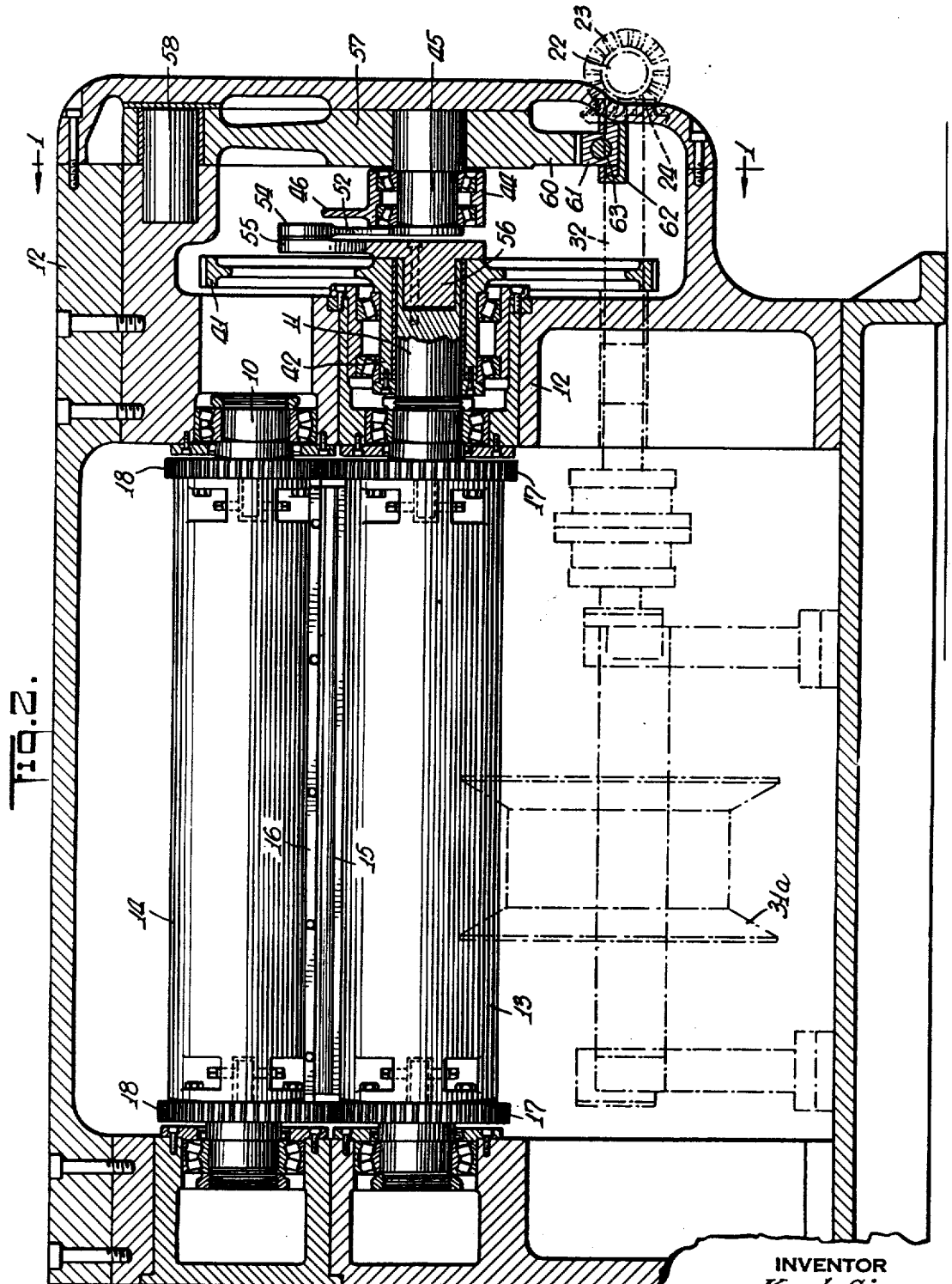

Nov. 18, 1941.  K. SIEG  2,262,971
CUTOFF MECHANISM
Filed Feb. 14, 1941  4 Sheets-Sheet 3
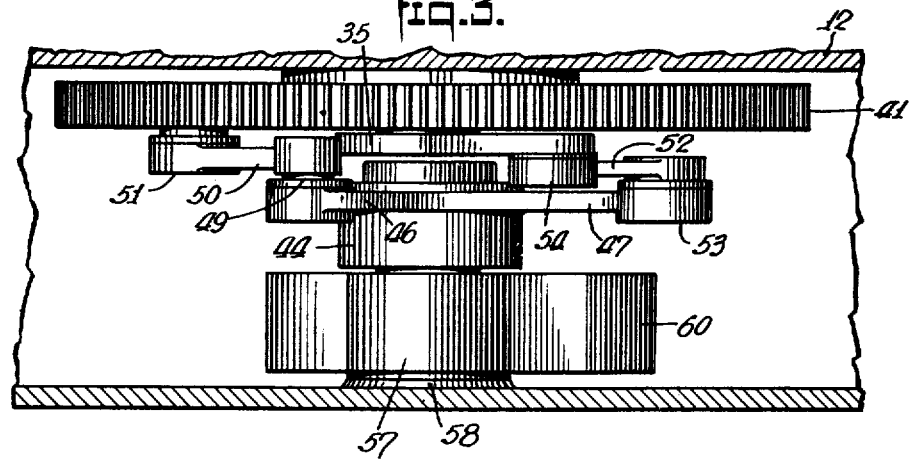
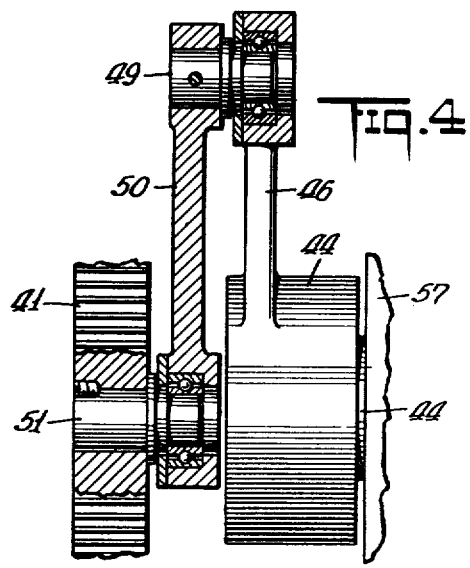
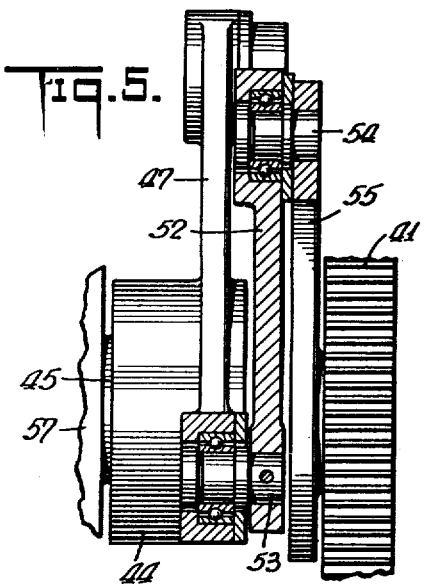
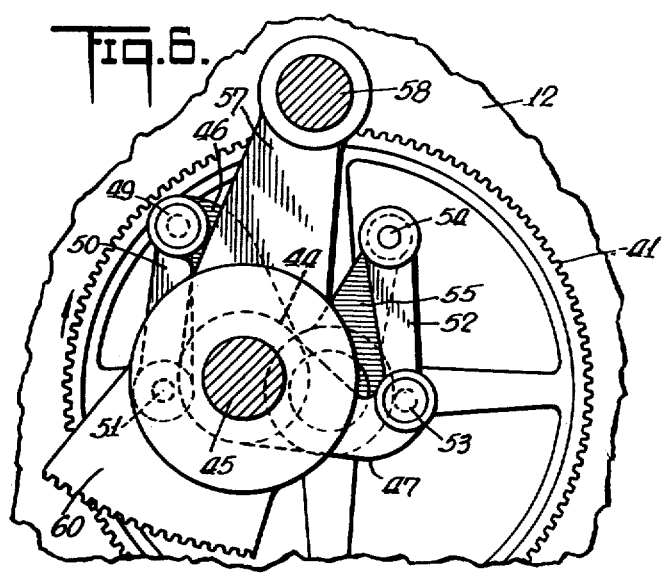
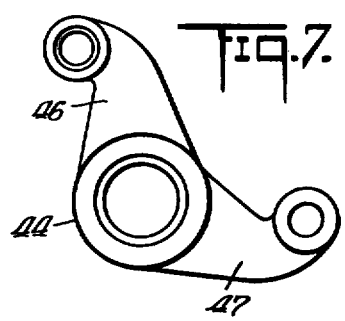
INVENTOR
Karl Sieg
BY
Dean Fairbanks Hirsch
ATTORNEYS

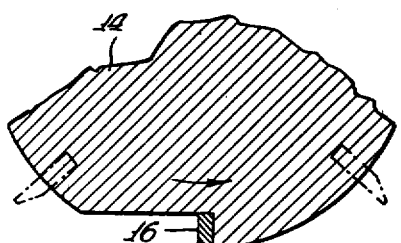
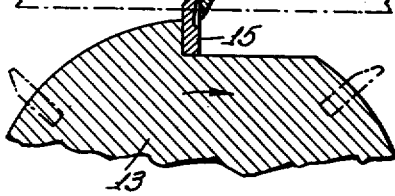
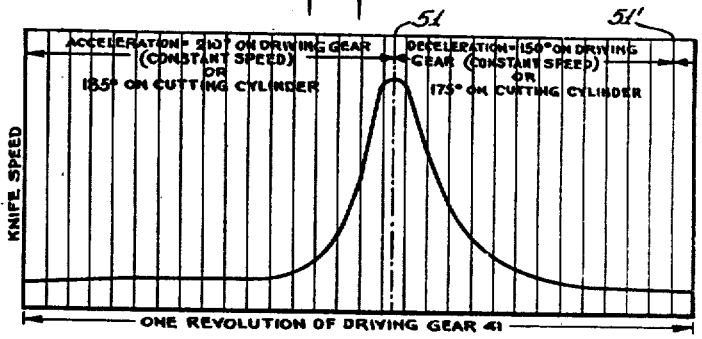
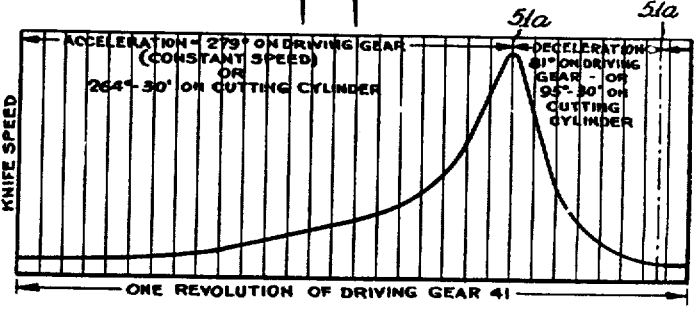
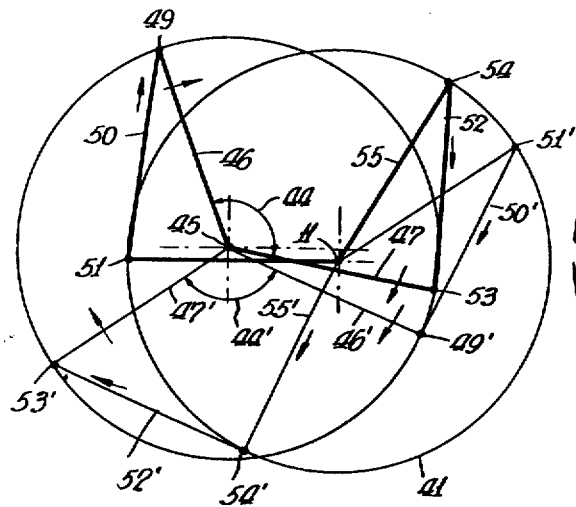
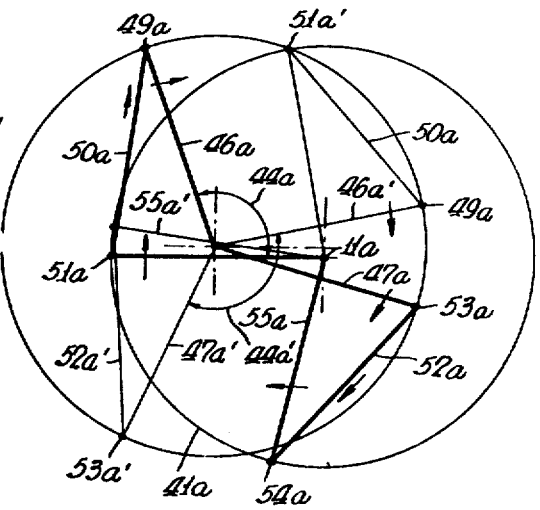

Patented Nov. 18, 1941

2,262,971

UNITED STATES PATENT OFFICE 2,262,971

CUTOFF MECHANISM

Karl Sieg, Philadelphia, Pa., assignor to Samuel M. Langston Co., a corporation of New Jersey Application February 14, 1941, Serial No. 378,919

6 Claims. (Cl. 164—68)

In the manufacture of corrugated board it is necessary to cut the board into successive sections, as it is continuously produced and delivered from the double facer, because the material cannot be rolled or bent to any substantial extent without destroying the inherent and desirable stiffness or rigidity.

To meet the requirements of industry, it is essential that the machine be adjustable so that the operator may cut the board into sheets of any desired lengths, within wide limits, such as 30" up to 150" or even longer, in accordance with one dimension of the product to be made of the sheet, for instance a box blank. The board may be produced and delivered from the double facer at relatively high speed, as for instance 400 linear feet per minute, and in order to make a clean cut, it is important that the knives of the cutter mechanism travel in the same direction and at substantially the same speed as the board, while cutting.

The common practice is to provide a pair of rotary knife carrying members between which the board passes, to vary the time cycles of revolution or R. P. M. of said members, and thus vary the frequency of cutting and the length of the cut off sections; and to also vary the angular velocity of said members in each revolution or cyclic movement, thus permitting the knives to always travel at the sheet speed while cutting, regardless of the total time cycle and the frequency of cutting.

As the speed of travel of the knives, while cutting, is constant for a given sheet speed, it will be seen that the speed of travel of the knives between successive cuts must be varied in accordance with the length of the sheet sections into which the board is being cut. If the sheets are short, the knives travel rapidly from cutting position back to cutting position, but if the sheets are long, the knives must travel at a very much lower average speed in this part of the cycle.

Although this general type of operation had been proposed in the Harbrecht Patent 1,039,124, the first machine for permitting of the simultaneous adjusting of both in the total time cycle and in the speed in the cycle, while the machine is running, was shown in my Patent 1,897,867, issued Feb. 14, 1933. Since then many other machines for obtaining the same general result have been designed and patented. In general, they all use a Reeves drive type of unit for obtaining the selected total time cycle, and some arrangement of adjustable elliptical gears, crank and slide, or lever and link mechanism for obtaining the speed variation in the cycle of rotation. In the lever and link type there may be a single link, as in Patent 2,202,872, or the pair of links connected by a pair of gears through which power is transmitted as in Patent 2,204,067, or a bell crank lever with links connecting the lever ends to the coaxial driven and driving members, as in Patent 2,215,762.

Any of these types are reasonably satisfactory where the machine is operated at relatively low speeds, or where the length of the sheets to be cut off is such that the difference between the slowest and fastest angular velocity of the knife in its cyclic travel is not very great. In all prior machines with which I am familiar, difficulties or objectionable results are encountered when the machine is adjusted for cutting sheets of such length that there is very big difference in the angular velocity of the knives at different parts of their cyclic paths, and the machine is operated at high speed to obtain the maximum output.

The parts through which the power is transmitted to the knives, and the speed of which varies greatly in the cycle, must be heavy and strong to stand the strains imparted particularly in cutting a very wide sheet of corrugated board at high speed, and the inertia which must be overcome in alternately speeding up and slowing down the parts imparts jar or vibration to the machine.

In certain adjusted positions the speed of knife travel does not exactly coincide with that of the sheet when the knives are in the plane of the knife axes and at right angles to the plane of the sheet; and the speed of the knives when entering the sheet is not the same as when leaving the sheet, and there is a substantial change in the speed of the knives between the point of entering and the point of leaving, so that a clean cut is not produced.

In some adjusted positions the time during which the acceleration is effected may be equal to the time during which deceleration is effected, but in other adjustments there is a wide difference, and this causes strain and vibration, and also a very undesirable asymmetry in rate of approach and recession of the knives with respect to the cutting speed.

In certain adjusted positions the rate and time of deceleration is substantially different from the rate and time of acceleration, and thus there is a jerky movement, with excessive strains and vibration.

The main object of my invention is to eliminate these objectionable conditions and to provide an adjustable drive mechanism for the cutter such that for all adjustments and all speeds, jar and vibration are reduced to a minimum; the rate and time for acceleration of the knives in their cyclic movement is substantially the same as for deceleration thereof; the knives will enter and leave the sheet at substantially the same speed as that of the board; and the rate of speed of the knives will remain substantially constant while in contact with the board, so that smooth operation and clean cuts are insured.

I have discovered that these objects and many important advantages may be secured by mounting the driving and driven members coaxial, mounting a bell crank lever on an axis which is parallel to the common axis of said member and laterally adjustable toward and from said common axis, and connecting said members to the arms of said lever by a pair of links, one of which is under tension and the other under compression during the transmission of power.

In the accompanying drawings I have shown only one embodiment of my invention, but this is to be considered merely as an example, and not in a limiting sense. The details illustrated are not essential, and may be varied through wide limits. In the drawings:

Fig. 1 is a side elevation somewhat diagrammatic, of one form of cut-off machine embodying the present invention, and taken substantially along line 1—1 of Fig. 2.

Fig. 2 is a section somewhat diagrammatic, taken on line 2—2 of Fig. 1, and showing the driving mechanism adjusted to cut sheets of minimum length.

Figs. 3, 4 and 5 are sections taken on lines 3—3, 4—4 and 5—5 of Fig. 1, respectively.

Fig. 6 is a side elevation of the drive mechanism, adjusted to cut long sheets.

Fig. 7 is a front elevation of the double crank forming part of the drive mechanism.

Fig. 8 is a diagrammatic view showing the drive mechanism adjusted for cutting relatively long sheets, and showing in heavy and light lines the position of the part at the points of highest and lowest speeds respectively of the knives.

Fig. 9 is a graph in which changes in velocity of the knife are plotted for equal successive angular movements of the uniform speed driving member.

Fig. 10 is a view similar to Fig. 8, but showing a prior art arrangement in which the links are both under compression.

Fig. 11 is a graph similar to Fig. 9, but showing velocity changes for the arrangement shown in Fig. 10, and Fig. 12 is a section through portions of the cutter cylinders, showing the knives and the board being cut in my machine, when adjusted for cutting a long sheet.

The cutter part of the mechanism illustrated may be any one of the standard types. That shown comprises a pair of cutter shafts 10 and 11 (Figs. 1 and 2) journaled in the frame structure 12 of the machine above and below the plane of feed of the sheet material to be cut. Affixed to the shafts 10 and 11 are cutting cylinders 13 and 14, carrying sheet cutting knives 15 and 16 on their peripheries respectively. The two cutting cylinders 13 and 14 are driven at the same peripheral speed by intermeshing gears 17 and 18, rigid with said cylinders respectively.

The sheet material is continuously delivered between the two cutter cylinders 13 and 14 by means of any conventional form of feeding mechanism. That illustrated includes a pair of feed rollers 20 and 21 (Fig. 1), one of which, as for instance the lower feed roller 21, is positively driven from a main drive shaft 22 by a train of gears including a bevel gear 23 on the main shaft 22, a bevel gear 24 on a shaft 32, and intermeshing spur gears 25, 26, 27 and 28, the last mentioned one being on the shaft of the lower feed roller 21.

The upper roller 20 may be rotated by its frictional engagement with the traveling sheet, or may be positively driven from the roller 21 through a gear drive.

In order to vary the length of sheet sections being cut, without varying the speed of travel of the sheet material, the transmission between the drive shaft 22 and the cutter shaft 11 includes a variable speed transmission mechanism 31 having an input shaft 32 driven from the main shaft 22 through the intermeshing bevel gears 23 and 24, and having an output shaft 33. This variable speed transmission 31 is not shown in detail, as it may be of any standard design such as that known in the trade as the P. I. V. or the Reeves drive, or in some instances may constitute a speed change device of the gear type, or of other type.

The construction indicated on the drawings has two double bevel pulleys 31a, 31b, connected by a belt. Adjustments in speed ratio may be selectively made in accordance with the desired sheet length, by rotation of a control shaft 34 from a suitable handle 35, or a motor 35', through a chain drive connection 36, to bring together or spread apart the two sections of one or both double bevel pulleys.

The output shaft 33 of the variable speed transmission has a pinion 40 meshing with a much larger gear 41, having an axial sleeve extension 42 journaled in the frame 12 and encircling the cutter shaft 11 so as to be coaxial therewith and relatively rotatable in respect thereto. The relative sizes of the pinion and gear and the circumference of the cutter are selected in accordance with the minimum length of the sheet to be cut and the maximum speed of the output shaft of the Reeves or other variable speed drive.

My invention is concerned primarily with the means employed for transmitting power from the driving element shown as the gear 41, and which normally rotates with uniform angular velocity, to the driven element shown as the cutter shaft 11, which is coaxial with said gear, so as to impart to the latter the desired kind and extent of variation in angular velocity in each cycle of rotation.

Generally speaking, this transmission means includes a bell crank or double arm lever mounted for rotation about an axis which may be coaxial with said driving and driven element, and a pair of links, one connecting one arm of said lever to said driving element, and the other connecting the other arm to the driven element, and extending in such directions from said arms that one is always under tension and the other is under compression during the operation of the machine. With the axis of the double arm lever in alignment with the common axis of the driving and driven elements, the driven element will rotate with uniform angular velocity. As the axis of said lever is moved laterally to progressively greater distances from said common axis, the speed of the driven element, when in cutting position, will remain substantially constant, but there will be progressively greater alternate deceleration and acceleration between cutting positions.

By reason of the arrangement whereby one link pushes while the other pulls, lateral adjustment of the axis of the double arm lever leaves the arc in which the driven element is decelerated substantially equal to the arc in which said element is accelerated. It also keeps the center of the arc of highest speed at substantially the same point, which is the common plane of the axes of the two cutter shafts, and where the cutting is completed and the knives start to leave the board. It makes the speed of the knives substantially constant through the arc extending from the point where the knives enter the board to the point where they leave it after completing the cut. These highly desirable conditions are maintained in all adjustments from that for the shortest sheet to that for the longest one, and permit the operation of the machine at high speed with the minimum strain and vibration, and make clean cuts for all adjustments.

Now referring to the specific form shown in the drawings, there is shown a double arm or bell crank lever 44 fulcrumed on a support 45, and having a pair of arms 46 and 47, the arm 46 being pivotally connected by a pin 49 to a link 50, the other end of which link is connected to the gear 41 by a pin 51. The other arm, 47, is pivotally connected to one end of a link 52 by a pin 53, the opposite end of this link 52 being connected by a pin 54 to the end of an arm 55 which is rigidly secured to the end of the shaft 11 by a stud 56 keyed in a socket in the end of said shaft, as shown particularly in Fig. 2.

Thus, as the gear 41, which is the driving gear, rotates in a clockwise direction as shown in Fig. 2, and the diagrammatic view of Fig. 8, the portion of the gear between the hub and the pin 51 acts as a lever putting the link 50 under compression and pushing it to rotate the arms 46 and 47 of the double arm lever. The arm 47 through the pin 53 puts the link 52 under tension and pulls on the pin 54 of the cutter shaft arm 55, to rotate said shaft and the cutter.

The compression on one link and tension on the other will be applied, but in reverse order, if the rotation be in the opposite direction for a board fed from the opposite side of the cutters, and where they would rotate in the other direction. Mechanically considered, the compression and tension effect is the result of having the links extending from opposite sides of the general direction of the length of the double arm lever.

If the support 45 of the double arm lever be coaxial with the gear 41 and shaft 11, as shown in Fig. 1, the cutters will rotate with uniform angular velocity, the same as the gear. In order to effect adjustments in the rate of acceleration and deceleration of the two cutting cylinders 13 and 14 in different parts of their cycle, to compensate for adjustments in the variable speed transmission 31, the position of the fulcrum point 45 of the double arm crank is adjusted.

In the particular adjusting means shown, the fulcrum support 45 is carried by an arm or member 57, pivotally mounted at its upper end in a pivot pin 58 mounted in the frame 12 in such a position that the swinging arc of the axis of said fulcrum support passes through the axis of the cutter shaft 11. For angularly adjusting this swinging arm 57, the lower section 60 of said arm is in the form of a gear segment meshing with a rack 61 slidable in a guide 62. This rack 61 is moved longitudinally by means of a screw 63 threaded therein, and held against axial movement in the bearing 65. Affixed to the outer end of this screw 63 is a handle 66, by which said screw may be rotated.

For cutting sheets of minimum length, the fulcrum support 45 is set in coaxial position with respect to the cutter shaft 11 and the driving gear 41, as shown in Fig. 1. With this setting of the fulcrum support 45, the double crank 44 will be driven at a constant angular speed equal to that of the drive gear 41, and corresponding to the speed of travel of the sheet.

When the variable speed transmission 31 has been adjusted to cut longer sheets by decreasing the frequency of rotation of the two cutting cylinders 13 and 14 in respect to the constant speed of travel of the sheet, the handle 66 is rotated to swing the arm 57 about its pivotal support 58, so that the fulcrum support 45 is eccentric with respect to the drive gear 41 and the cutter shaft 11, as shown in Fig. 6. This adjustment in the eccentricity of the fulcrum support 45 with respect to the drive 41 is effected to such an extent as will correspond to the setting of the variable speed transmission 31. For that purpose there may be provided an indicating device such as a dial (not shown), which is associated with the handle 35 controlling the variable speed transmission 31, and which is calibrated with different sheet length indicia as a guide in the operation of said handle. A similar indicating device (not shown) may be associated with the handle 66, so that rotation of the two handles 35 and 66 to corresponding settings is facilitated. The handles or the parts operated by them may be rotated by separate motors simultaneously stopped and started to effect simultaneously and correspondingly proper adjustments, or the handles 35 and 66, or the parts connected thereto may be mechanically connected so that they are rotated simultaneously to the proper relative extents, so that for each adjustment for sheet length there will be the correct setting of variable angular velocity of the cutters. Such interconnecting means have not been shown, as many forms are well known in this art since my Patent 1,897,867.

In order that the operation and advantages of my improved apparatus may be more clearly visualized, I have shown diagrammatically in Fig. 8 certain positions which the operating parts may assume when adjusted for the cutting of a long sheet. When the parts have moved to the positions shown in heavy lines, the knives will be traveling at their maximum velocity and will have completed the cut and extend through the board. The knives will be directly above the axis of the shaft 11 and of the gear 41. From that point the knives begin to decelerate, and this will continue until the parts reach the positions shown in light lines, and which are indicated by the same reference numerals, but with an added prime. It will be noted that the angular distance from the point 51 in a clockwise direction to the point 51' on the driving gear is about 150°, whereas the angular distance from the point 54 to the point 54' on the driven member 55 which is rigid with the knife 15, and during which angular distance the knives are decelerating, is 175°, which is only 5° short of a half revolution. The knives accelerate while the drive pin travels from point 54' back to point 54, which is 185°, or only 5° over a half revolution. Thus the angular distances through which there is deceleration and acceleration are substantially equal.

In Fig. 9 the equally spaced vertical lines represent equal angular velocities of the driving gear 41 in a complete revolution. The spacings between successive lines represent 12° each. The curve in its spacing from the base line indicates the progressively increasing and decreasing velocity. The point on the driving gear corresponding to the point of maximum velocity of the knives is indicated as 51, which corresponds to the position of pin 51 in heavy lines in Fig. 8, and the point on the driving gear corresponding to the point of minimum velocity of the knives is indicated as 51', which corresponds to the position of the pin 51' shown in light lines in Fig. 8.

In Fig. 10 I have shown diagrammatically the position of the parts of an apparatus in which both the links are under compression or are under tension (depending on the direction of rotation of the drive) under all conditions of operation. In other words, the links both extend from the same side of the general direction of the length of the double arm crank. Here again the parts are shown adjusted for cutting a long sheet, and in heavy lines in the position where the knives are traveling at maximum velocity, and in light lines where they are at their minimum velocity. To facilitate comparison with Fig. 8, the same reference numerals, but with an added a for the high speed position and an added a' for the low speed, are used.

It will be noted that with this arrangement, the angular distance in a clockwise direction from the point 51a to 51a' on the driving gear 41a, is only about 81°, whereas the angular distance between the points 54a and 54a' on the driven member, and during which the knives are decelerating, is about 95° 30'. The acceleration of the driving member from 51a' to 51a is through 279°, and from 54a' to 54a on the driven member is 264° 30'. Thus there is far greater strain in slowing down the heavy parts in the much shorter angular distance than there is in my improved construction.

Fig. 11 shows the same for the apparatus of Fig. 10 as Fig. 9 does for my apparatus of Fig. 8. In this Fig. 11 it will be seen that the velocity comes to a rather sharp peak, rather than to a broader and flatter one, so that from the point where the knife enters the sheet to the center cutting position, there is substantial increase in speed of the knife; and there is likewise a substantial decrease in speed from center position to the point where the knife leaves the sheet. Thus it is not possible to make as clean a cut, and there is liability of tearing or crumpling the edges of the sheets at the cut.

In Fig. 12 the knives are shown in solid lines on the center of the cutting arc. Two other positions are shown in dotted lines. These are about 90° apart, but the knives being in highest speed range will move through the arc about 90° while the driving gear 41 is moving through only 24°, or about ¼ as far. From Fig. 12 it will be seen that the knives contact the board for about 45° of their travel, corresponding to about 12° travel of the drive gear 41. From Fig. 9 it will be seen that the top or high velocity part of the curve is fairly flat, and the velocity is fairly constant from one vertical line to the next, which represents 12° of drive movement. Thus the acceleration of the knives in approaching the board about equals the deceleration in leaving it, and the speed is substantially constant while the knives are in contact with the board. No such advantageous operation is possible with the arrangement shown in Fig. 10, as will appear from the curve shown in Fig. 11, where the peak is sharp, and the acceleration period is 2¾ times the deceleration period. These angles are given for a cutter carrier about 10 inches in diameter, which is a common size for machines for cutting corrugated board, where the cutter speed is substantially uniform for cutting the minimum length of sheets of about 30 inches.

I have referred to the part 44 with its arms 46 and 47 as a double arm or crank lever, but it will be understood that a complete disc could be employed as the full equivalent, and with the pins 49 and 53 properly positioned thereon. Likewise the pin 51 may be on an arm or a disc rigid with the gear 41, instead of on it, and the arm 55 might be a complete disc. The construction shown is preferable in the interest of saving weight and inertia of the parts.

In the machine shown the knife has a uniform angular velocity in cutting the shortest sheet, and the alternate deceleration and acceleration is employed for all longer sheets. Thus the strain of enforcing speed variations is only when the time for the total cycle is reduced. The parts may be so designed that the uniform angular velocity is when cutting a middle sized sheet, and the speed is accelerated and then decelerated for shorter sheets, and is decelerated and then accelerated for longer sheets. This is effected by moving the axis of the double arm lever in one direction or the other from a coaxial position, instead of moving to only one side of said coaxial position, as in the form shown.

Although in the form illustrated the cutter members are shown as of the rotary type, other types of traveling cut-off mechanism might be substituted and driven from the shaft 11.

Having thus described my invention, what I claim as new and desire to secure by Letters Patent is:

1. An apparatus for driving a cutting member and imparting alternate acceleration and deceleration thereto in each cyclic movement, including coaxial rotary driving and driven members, a double arm crank having its axis substantially parallel to the axis of the drive member of said cutter, a link connecting said driving member to one arm of said crank for driving said crank, a link connecting the other arm of said crank to said driven member for transmitting power from said crank toward said cutter, one of said links being under compression and the other under tension during drive operations, and means for adjusting the eccentricity of said crank with respect to said members, for modifying the variation in speed of said cutter during each cycle thereof.

2. An apparatus for subdividing continuously advancing sheet material transversely into sections, including a rotary cutter, a driving member, a double arm crank having its axis parallel to the axis of said cutter, a link between said driving member and one arm of said double arm crank, another link between the other arm of said latter crank and said driven crank, said links extending from opposite sides of the general direction of the length of said double arm crank, and means for adjusting the position of the axis of said crank with respect to the axis of said cutter for modifying the variation in speed of said cutter during each cycle thereof.

3. An apparatus for subdividing continuously advancing sheet material transversely into sections, including coaxial rotary driving and driven members, a rotary cutter operatively connected to said driven member, a rotatable member, a link connecting said driving member and said rotatable member, a second link connecting said rotatable member and said driven member, one of said links being under compression and the other under tension during running of the apparatus, and means for adjusting the position of the axis of said rotatable member with respect to the axis of said members, to impart variation in the speed of said cutter during each cycle thereof, while maintaining the speed of the cutter substantially constant while engaging said material.

4. An apparatus for subdividing continuously advancing sheet material transversely into sections, including coaxial rotary driving and driven members, a rotary cutter operatively connected to said driven member, a rotatable member, a link connecting said driving member and said rotatable member, a second link connecting said rotatable member and said driven member, one of said links being under compression and the other under tension during running of the apparatus, and means for swinging the axis of said rotatable member about a pivotal center to adjust the position of said axis to a greater or lesser distance from the axis of said members, to impart variation in the speed of said cutter during each cycle thereof, while maintaining the speed of the cutter substantially constant while engaging said material.

5. An apparatus for subdividing continuously advancing sheet material transversely into sections, including coaxial rotary driving and driven members, a rotary cutter operatively connected to said driven member, a rotatable member, a link connecting said driving member and said rotatable member, a second link connecting said rotatable member and said driven member, one of said links being under compression and the other under tension during running of the apparatus, a pivotally supported member carrying said rotatable member, and means for swinging said pivotally supported member to move the axis of said rotatable member in an arc intersecting the common axis of said driving and driven members.

6. An apparatus for subdividing continuously advancing sheet material transversely into sections, including rotary driving and driven members, a rotary cutter operatively connected to said driven member, a rotatable member, a link connecting said driving member and said rotatable member, a second link connecting said rotatable member and said driven member, one of said links being under compression and the other under tension during running of the apparatus, and means for laterally adjusting the axis of said rotatable member to control the rates of acceleration and deceleration of the cutter in its cycle of revolution.

KARL SIEG.